(12) United States Patent
Orita et al.

(10) Patent No.: US 10,941,724 B2
(45) Date of Patent: Mar. 9, 2021

(54) ENGINE SYSTEM CONTROL DEVICE (71) Applicant: Hitachi Automotive Systems, Ltd., Hitachinaka (JP)

(72) Inventors: Hisayuki Orita, Tokyo (JP); Masayuki Saruwatari, Hitachinaka (JP); Kazuhiro Oryoji, Tokyo (JP); Motoyuki Abe, Tokyo (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 238 days.

(21) Appl. No.: 15/761,418

(22) PCT Filed: Aug. 8, 2016

(86) PCT No.: PCT/JP2016/073217
§ 371 (c)(1),
(2) Date: Mar. 19, 2018

(87) PCT Pub. No.: WO2017/051628
PCT Pub. Date: Mar. 30, 2017

(65) Prior Publication Data
US 2020/0240340 A1 Jul. 30, 2020

(30) Foreign Application Priority Data

Sep. 25, 2015 (JP) .............................. JP2015-187586

(51) Int. Cl.
*F02D 41/06* (2006.01)
*F02M 31/087* (2006.01)
*F02D 41/04* (2006.01)
*F01N 5/00* (2006.01)
*F02D 9/04* (2006.01)
*F02D 9/08* (2006.01)
*F02M 35/10* (2006.01)
*F02M 31/04* (2006.01)
(Continued)

(52) U.S. Cl.
CPC .............. *F02D 41/04* (2013.01); *F01N 5/00* (2013.01); *F02D 9/04* (2013.01); *F02D 9/08* (2013.01);
(Continued)

(58) Field of Classification Search
CPC . F02D 41/062; F02D 9/04; F02D 9/08; F02D 41/068; F02D 2200/0414;
(Continued)

(56) References Cited

U.S. PATENT DOCUMENTS 8,881,711 B1* 11/2014 Jasper .................. F02M 31/093
123/550
2002/0040708 A1* 4/2002 Chmela ................... F01N 13/08
123/568.14
(Continued)

FOREIGN PATENT DOCUMENTS

EP      1 707 791 A2    10/2006
JP      59-115458 A     7/1984
(Continued)

OTHER PUBLICATIONS

Extended European Search Report issued in counterpart European Application No. 16848416.0 dated Feb. 28, 2019 (six pages).

(Continued)

*Primary Examiner* — Jacob M Amick
(74) *Attorney, Agent, or Firm* — Crowell & Moring LLP (57) ABSTRACT

An object of the present invention is to provide an engine system control device capable of stabilizing a combustion state, while improving fuel economy by performing intake air heating. According to the present invention, there is provided an engine system control device which controls an engine system including an engine configured to combust air-fuel mixture, an intake air path configured to take air to the engine, and an intake air heating mechanism configured to heat the intake air, wherein a heating amount of the intake air is controlled depending on a combustion speed of the air-fuel mixture.

7 Claims, 11 Drawing Sheets (51) Int. Cl.
  *F02M 31/08* (2006.01)
  *F02M 31/06* (2006.01)

(52) U.S. Cl.
  CPC ......... *F02D 41/062* (2013.01); *F02D 41/068* (2013.01); *F02M 31/04* (2013.01); *F02M 31/066* (2013.01); *F02M 31/08* (2013.01); *F02M 31/087* (2013.01); *F02M 35/10268* (2013.01); *F02D 2200/0414* (2013.01)

(58) Field of Classification Search
  CPC ............ F02D 41/064; F01N 5/00; F01N 5/02; F02M 35/10268; F02M 31/04; F02M 31/045; F02M 31/066; F02M 31/07; F02M 31/08; F02M 31/087; F02M 31/093
  See application file for complete search history.

(56) References Cited

U.S. PATENT DOCUMENTS

| | | | | |
|---|---|---|---|---|
| 2010/0071659 | A1* | 3/2010 | Moriya | F02D 41/345 123/406.41 |
| 2011/0139133 | A1 | 6/2011 | Surnilla et al. | |
| 2013/0247847 | A1* | 9/2013 | Nogawa | F01P 7/165 123/41.34 |

FOREIGN PATENT DOCUMENTS

| | | |
|---|---|---|
| JP | 5-26028 B2 | 4/1993 |
| JP | 2002-180910 A | 6/2002 |
| JP | 2006-37931 A | 2/2006 |
| JP | 2007-224807 A | 9/2007 |
| JP | 2009-156191 A | 7/2009 |
| JP | 2013-231357 A | 11/2013 |

OTHER PUBLICATIONS

Chinese-language Office Action issued in counterpart Chinese Application No. 201680053814.9 dated Aug. 2, 2019 with partial English translation (17 pages).

Japanese-language International Search Report (PCT/ISA/210) issued in PCT Application No. PCT/JP2016/073217 with English translation dated Nov. 22, 2016 (five (5) pages).

Japanese-language Written Opinion (PCT/ISA/237) issued in PCT Application No. PCT/JP2016/073217 dated Nov. 22, 2016 (four (4) pages).

* cited by examiner

ENGINE SYSTEM CONTROL DEVICE

TECHNICAL FIELD

The present invention relates to an engine system control device which recovers waste heat generated by combustion in an engine that combusts fuel to obtain power, and effectively uses the waste heat.

BACKGROUND ART

In related art, as a method for improving fuel economy of an engine that combusts fuel to obtain power, there has been a method for heating the intake air (for example, PTL 1 and PTL 2).

A diesel engine using light oil supplies intake air and fuel, and self-ignites and combusts the intake air and fuel in a compression process. In the case of a diesel engine, when the intake air is heated, the combustion temperature can be raised, and self-ignition can be promoted. In the diesel engine, the combustion becomes unstable when the combustion temperature drops. Therefore, it is conceivable to control the heating amount of intake air on the basis of the combustion temperature.

Also, in a gasoline engine, when the combustion temperature excessively rises, knocking occurs and the fuel becomes unstable. Therefore, in the gasoline engine, it is also conceivable to control the heating amount of intake air on the basis of the combustion temperature.

CITATION LIST

Patent Literatures

PTL 1: JP 2006-37931 A
PTL 2: JP 2013-231357 A

SUMMARY OF INVENTION

Technical Problem

In this way, although the combustion temperature largely depends on the combustion state, since the combustion state is not determined only by the combustion temperature, if the heating amount of intake air is controlled on the basis of the combustion temperature, it is not sufficient to stabilize the combustion state.

Thus, an object of the present invention is to provide an engine system control device capable of stabilizing the combustion state, while improving fuel economy by performing the intake air heating.

Solution to Problem

According to the present invention, there is provided an engine system control device which controls an engine system including an engine configured to combust air-fuel mixture, an intake air path configured to take air to the engine, and an intake air heating mechanism configured to heat the intake air, wherein a heating amount of the intake air is controlled depending on a combustion speed of the air-fuel mixture.

Advantageous Effects of Invention

According to the present invention, it is possible to stabilize the combustion state, while improving the fuel economy by performing the intake air heating.

DESCRIPTION OF EMBODIMENTS

Hereinafter, embodiments of the present invention will be described with reference to the drawings. In the following description, an example of application to a gasoline engine and an example of application to a diesel engine will be described together. As it will be described below, in the gasoline engine, the combustion speed is used to set an upper limit value of the heating amount of the intake air heating, and in the diesel engine, the combustion speed is used to set a lower limit value of the heating amount of the intake air heating.

First Embodiment

Figure 1:
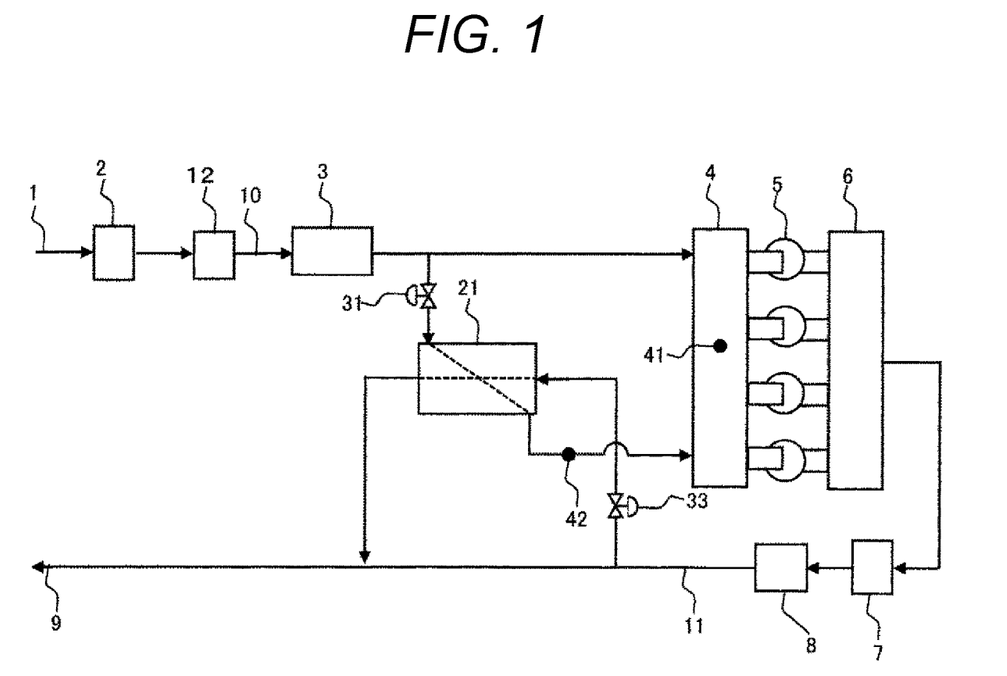
FIG. 1 is a configuration diagram of an engine system according to a first embodiment.

FIG. 1 illustrates an engine system according to this embodiment.

Air 1 is supplied to an engine 5 by an intake air pipe 10. The intake air pipe 10 is provided with a compression turbo 2 driven under conditions of a high engine load. In the gasoline engine, A/F which is a ratio of an air flow rate A and a fuel flow rate F is made constant and burned in the engine. Even if a downstream throttle valve 3 is fully opened, when the air flow rate is insufficient, the compression turbo 2 is driven to increase the intake air flow rate. Since the intake air temperature rises by compression, the intake air is cooled by an intercooler 12 to prevent knocking at the time of the engine combustion.

On the other hand, in a diesel engine, self-ignition and burnout of fuel are important. The compression turbo 2 is used to increase the cylinder internal pressure of the engine. Since the likelihood can be obtained in the range of A/F or the intake air temperature by increasing the pressure, the intercooler 12 and the throttle valve 3 may not be provided, and the output of the compression turbo 2 may be roughly controlled depending on the engine load, and is controlled by the fuel flow rate.

An intake air manifold 4 is located just before the engine 5. A metallic material having a high heat resistance temperature may be used as the intake air manifold 4, but a lightweight resin material may be used in some cases. The latter has a heat-resistant temperature, and on heating the intake air, its heat-resistant temperature becomes an upper limit temperature of the intake air temperature.

The intake air heating is performed by a heat exchanger 21 that exchanges heat between gas and gas. Some of the intake air branch from the middle of the intake air pipe 10 and are supplied to the heat exchange 21. Further, some of the high temperature exhaust gas branch from the exhaust air pipe 11, are supplied to the heat exchanger 21, and are heat-exchanged in a non-contact manner. The heat exchange mechanism serves as an intake air heating mechanism. That is, the heat exchanger 21 is configured to exchange heat between the intake air flowing through an intake air diverging path diverged from the intake air path and the exhaust air flowing through an exhaust air diverging path diverged from the exhaust air path exhausted from the engine.

A flow rate control valve 31 is provided between the diverged position of the intake air pipe 10 and the heat exchanger 21, and a flow rate control valve 33 is provided between the diverged position of the exhaust air pipe 11 and the heat exchanger 21. The amount of heat exchange of the heat exchanger 21, that is, the calorific value of the intake air heating is adjusted. When the flow rate control valve 31 is opened, the flow rate of the intake air supplied to the heat exchanger 21 increases, and the flow rate of the intake air from the diverged position of the intake air pipe 10 to the engine 5 decreases. When the flow rate control valve 33 is opened, the flow rate of the exhaust gas supplied to the heat exchanger 21 increases, and the flow rate of exhaust gas discharged from the diverged position of the exhaust air pipe 11 to the atmosphere decreases.

In the gasoline engine, the intake air flow rate to be supplied at the opening degree of the throttle valve 3 is set depending on the engine load. The diverged position of the intake air pipe 10 may be any position up to the intake air manifold 4, but is preferably downstream of the throttle valve 3. This is because it is possible to use the conventional method of setting the intake air flow rate to be supplied with the opening degree of the throttle valve 3.

In the exhaust air pipe 11, an expansion turbo 7 and an exhaust gas purifying catalyst 8 are located in order from the exhaust air manifold 6, and the exhaust gas is finally released to the atmosphere.

The expansion turbo 7 is driven by the exhaust gas pressure. In a gasoline engine, the expansion turbo 7 is driven under the condition in which engine load is high, and the compression turbo 2 is driven and supercharged. By connecting the compression turbo 2 and the expansion turbo 7 coaxially, the expansion turbo 7 is used as a drive source of the compression turbo 2. In the diesel engine, since the compression turbo 2 is constantly driven without depending on the engine load, the expansion turbo 7 is also constantly driven.

The exhaust gas of the gasoline engine contains NOx, CO and unburned components, and the exhaust gas purifying catalyst converts NOx into $N_2$, converts carbon monoxide and unburned components into $CO_2$ and releases them to the atmosphere. Fuel and air are supplied at an equivalent ratio to the combustion reaction, that is, at an air ratio of 1, and inconsistent reactions of oxidation and reduction are caused to simultaneously occur.

Although the exhaust gas of the diesel engine also contains NOx, CO and unburned components, because the exhaust gas is burnt at an air ratio of 1 or more, the combustion temperature is low, and NOx and CO decrease. However, since the exhaust gas contains oxygen, NOx cannot be purified by the exhaust gas purifying catalyst in the gasoline engine. Therefore, a dedicated catalyst or the like which adsorbs NOx and reduces NOx by blowing urea water is used. The unburned fuel reducing is promoted by EGR which causes the exhaust gas to recirculate in the engine and combusts it, and the unburned fuel is further removed by installing a filter for collecting soot.

The diverged position of the exhaust air pipe 11 may be any position as long as it is located downstream of the exhaust air manifold, but is preferably downstream of the exhaust gas purifying catalyst 8. This is because soot or condensable gas contained in the exhaust gas is prevented from adhering to and accumulating on the heat transfer pipes of the heat exchanger 22. In a diesel engine, the exhaust air pipe 11 is preferably provided downstream of a dedicated catalyst or a filter that collects soot.

The temperature of the exhaust gas is as high as 400° C. or higher, and the flow rate is higher than the intake air flow rate. Therefore, even if the exhaust gas temperature slightly drops, there is no problem. However, the temperature of the intake air is a control item of the present invention, and the temperature drop caused by heat radiation becomes a factor that makes a control difficult. Therefore, it is preferable to install the heat exchanger 21 near the engine 5 to suppress the temperature drop of the heated intake air. Further, since the heated intake air also suppresses the release in the middle of the pipe, it is preferable to directly supply the heated intake air to the intake air manifold 4. In the intake air manifold 4, the heated intake air and the unheated air are mixed with each other. It is preferable to provide a structure in which the mixing of the heated intake air and the unheated air is good.

Figure 2:
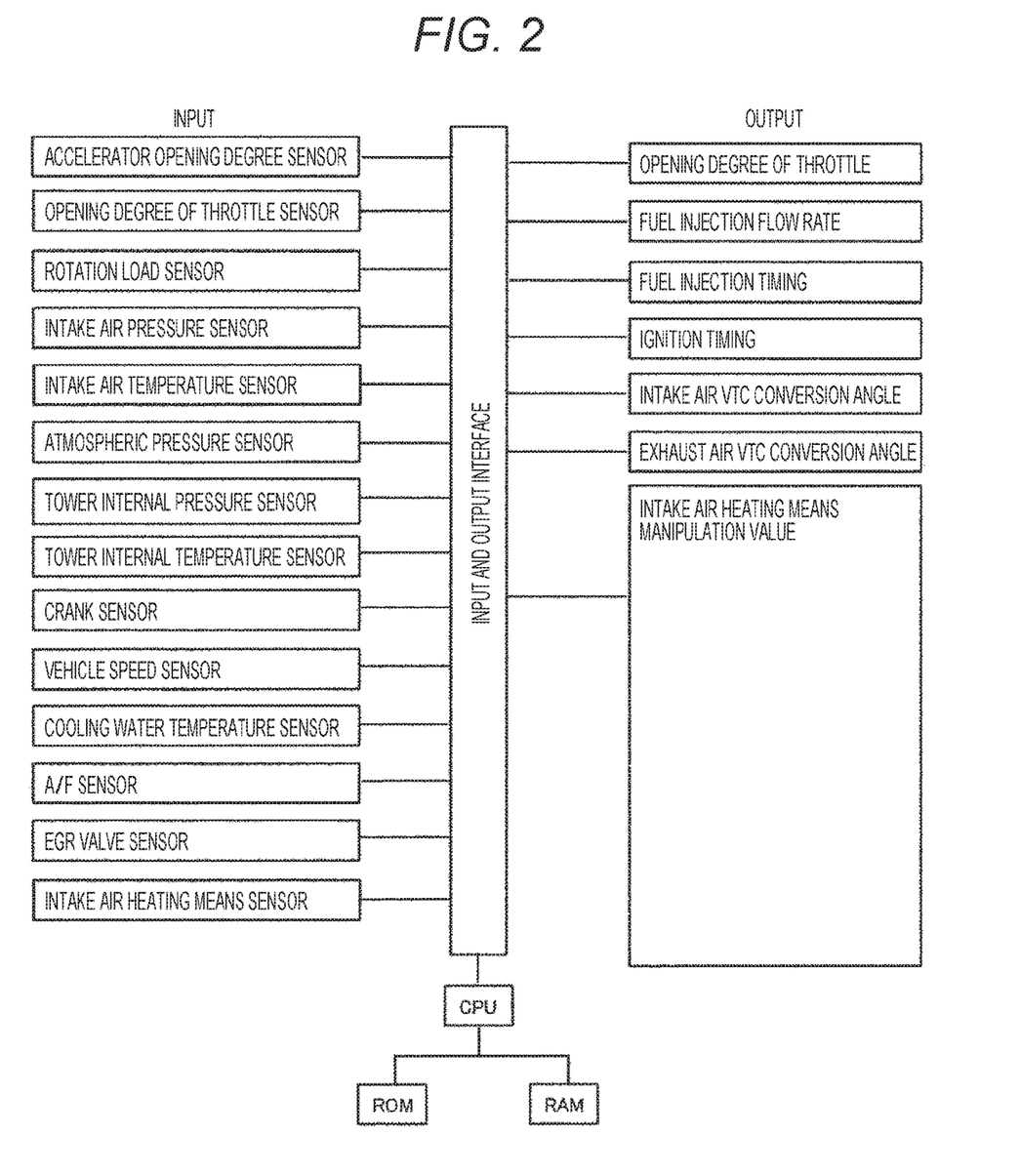
FIG. 2 is a diagram illustrating a control method of the engine system according to the first embodiment.

FIG. 2 illustrates the control method of the engine. A plurality of sensors which monitors the operating state is attached to the engine. These measured values are incorporated in the interface. In the CPU, a plurality of output conditions is determined by using the measured values taken from the sensor and by calculating the measured values in accordance with the engine load condition requested by a driver. A ROM and a RAM store data for simplifying and speeding up determination of output conditions. Data incapable of being rewritten is stored in the ROM, and data capable of being rewritten and temporarily stored is stored in the RAM.

The sensors required for controlling the intake air heating are thermometers 41 and 42 illustrated in FIG. 1. These sensors serve as the intake air heating means sensor of FIG. 2. In addition, the opening degrees of the flow rate control valves 31 and 33 illustrated in FIG. 1 is the intake air heating manipulation value of FIG. 2.

Figure 3:
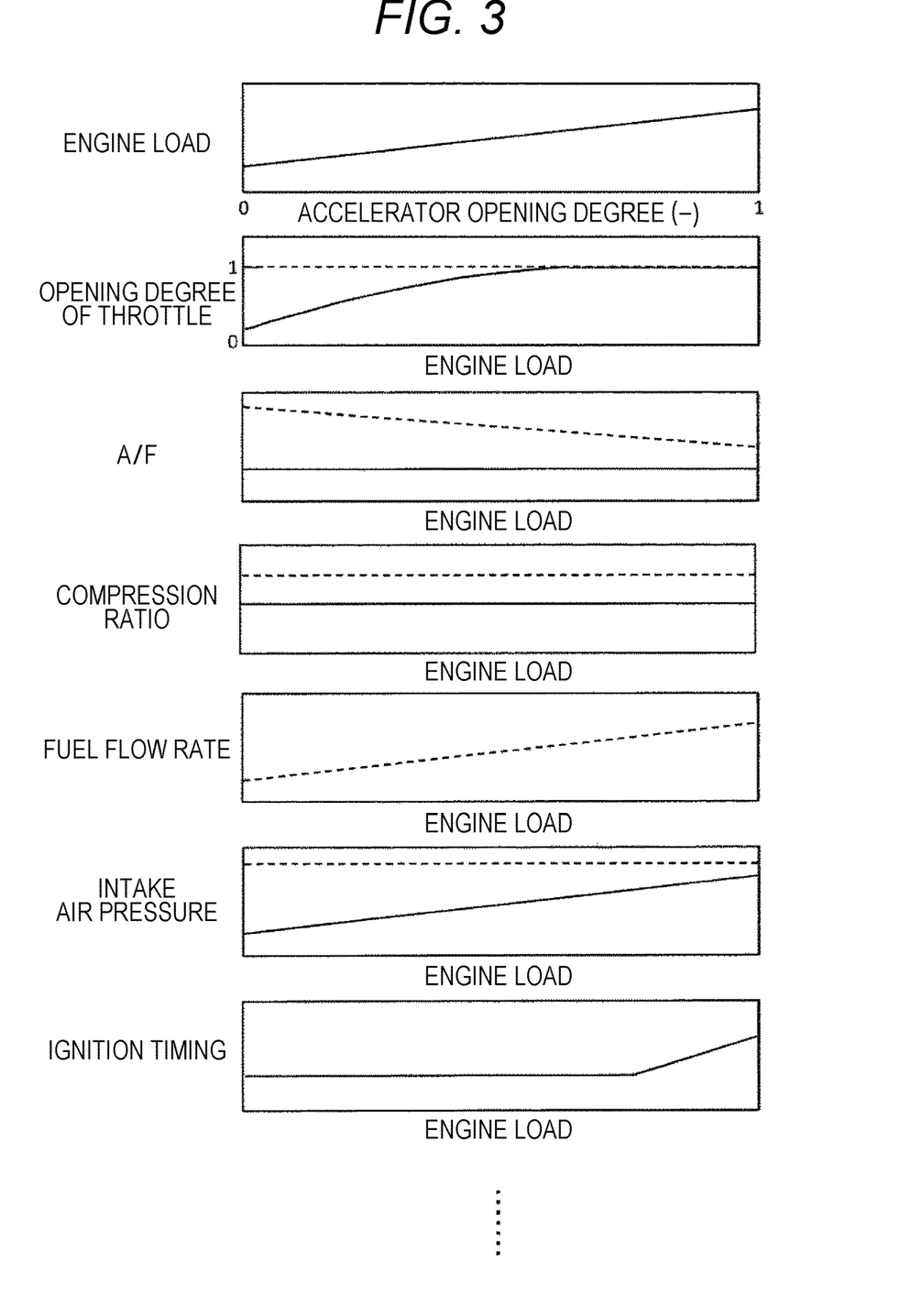
FIG. 3 is a diagram illustrating a group of data stored in a ROM according to the first embodiment.

FIG. 3 illustrates a data group stored in the ROM of the present invention. These are representative output conditions for constructing the engine load. This is the engine load required by the accelerator manipulated by the driver. A first stage is a relation between the opening degree of accelerator and the engine load.

A second stage is a relation between the engine load and the opening degree of throttle. A solid line is for a gasoline engine. When the opening degree of throttle is 1 or less, there is a relation in which the opening degree of throttle increases as the engine load increases. This range is also a range in which a pumping loss occurs, and the heating amount of intake air can also be controlled by the opening degree of throttle. When the opening degree of throttle is 1, that is, the engine load or higher that is fully opened, the compression turbo is operated, and the intake air is compressed and supplied. At that time, a pumping loss does not occur. A broken line is for the diesel engine, it is assumed that there is no throttle, and it is expressed as an opening degree of 1.

A third stage is a relation between the engine load and A/F. In the gasoline engine indicated by the solid line, since the air and the fuel are supplied at the equal ratio to the combustion, a constant A/F is obtained regardless of the engine load. On the other hand, in the diesel engine indicated by the broken line, there is a relation in which the A/F ratio is large at a low engine load and the A/F ratio decreases as the engine load increases. This is because the engine load with the fuel flow rate is changed.

A fourth stage is a relation between the engine load and the compression ratio in the engine cylinder. The compression ratio is a ratio of the capacity at the time of the largest volume and the capacity at the time of the smallest volume when the piston is driven in the engine cylinder, and is a value determined by the engine structure. Therefore, even for a gasoline engine or a diesel engine, a constant value is obtained. In recent years, there is an engine provided with a mechanism which changes the compression ratio depending on the engine load, and in that case, a relation in which the compression ratio varies may be introduced.

A fifth stage is a relation between the engine load and the fuel flow rate. In a gasoline engine, there is a relation of making a constant A/F regardless of the engine rotation speed. The fuel flow rate can be determined from the relation between the opening degree of slot and the intake air flow rate. Therefore, there is no solid line for the gasoline engine in the drawing. In the diesel engine, the air flow rate is almost equal regardless of the engine load, and the engine load is controlled by the fuel flow rate. That is, as indicated by a broken line in the drawing, there is a relation in which the fuel flow rate increases as the engine load increases.

A sixth stage is a relation between the engine load and the intake air pressure. A solid line is a gasoline engine and there is a relation in which a gasoline engine increases with respect to the engine load. When the opening degree of throttle is 1 or less, the relation can also be obtained from the relation between the engine load and the opening degree of throttle illustrated in the second stage. However, when the opening degree of throttle is 1 or more, it is necessary to use this relation in order to determine the operation condition of the compression turbo. In the diesel engine, as illustrated by a broken line, the engine rotation speed is almost constant. A seventh stage is a relation between the engine rotation speed and the ignition timing. As the vertical axis increases, the ignition timing becomes faster. Since the diesel engine is self-ignited, there is no broken line. In a gasoline engine, the engine load is high, and a manipulation for fastening the ignition timing is required within the range in which the compression turbo is operated. This is because knocking caused by self-ignition is prevented.

The data group is not limited to the first to seventh stages, but data for simplifying the calculation in the CPU and performing the high-speed calculation is stored.

Figure 4:
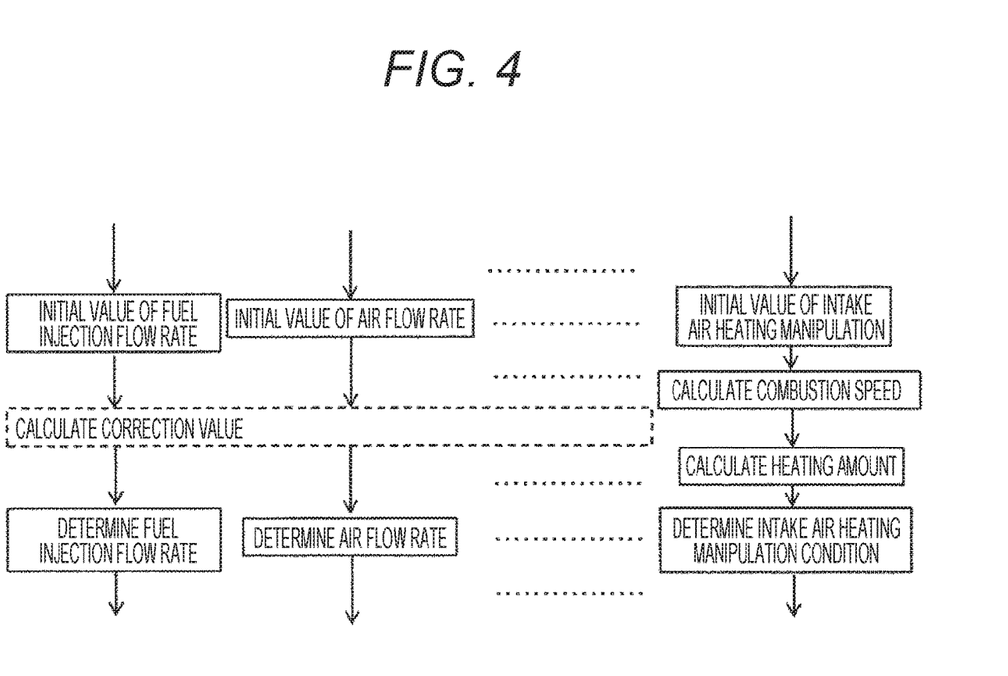
FIG. 4 is a diagram illustrating an operation example of a CPU in the first embodiment.

FIG. 4 illustrates a calculation example of the CPU of the present invention. To determine the fuel injection flow rate, the related data in the data group input to the ROM is set as an initial value, a correction calculation is performed, using the engine load required by the driver and the measured values of various sensors, and the manipulation conditions of output are determined. For example, the driver requests an engine load 0 on a downward slope. That is, the accelerator opening degree becomes zero. When a situation in which the engine brake is required is determined from the measured values of various sensors, an output for stopping the fuel supply will be issued. This enables energy saving operation of the engine.

This also applies to the intake air heating. For example, in the system illustrated in FIG. 1, as the initial value of the intake air heating manipulation, the relation with the opening degrees of the representative flow rate control valves 31 and 33 with respect to the engine load is registered in the ROM, and is used as the initial value of the intake air heating calculation to calculate the combustion speed. Further, it is possible to calculate the amount of heat of intake air heating, correct the opening degrees of the flow rate control valves 31 and 33 as the output of FIG. 2, and determine the manipulation opening degree.

There is a limit value in the combustion speed, and by bringing the current combustion speed close to the limit value, the intake air heating can be performed efficiently. Therefore, limit value data of the combustion speed is required.

Figure 5:
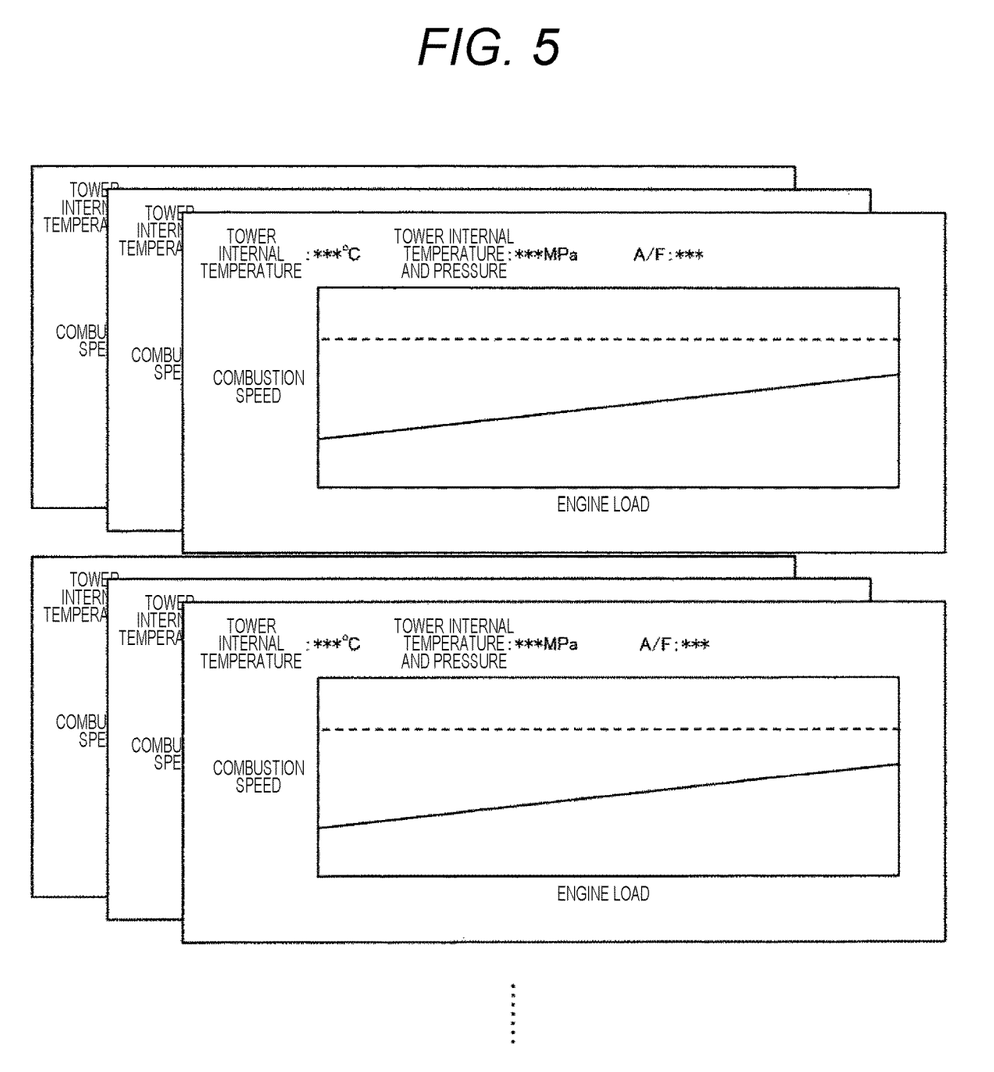
FIG. 5 is a diagram illustrating a combustion speed limit value data group in the first embodiment.

FIG. 5 illustrates a limit value data group of the combustion speed of the present invention. A solid line is an upper limit value of the combustion speed that does not cause knocking in the gasoline engine. It has characteristics that the value increases in proportion to the engine load. A broken line is a lower limit value of the combustion speed that can be self-ignited by the diesel engine. It has characteristics that the value does not change with respect to the engine load. The reason is that the gasoline engine has the combustion form in which the flame is propagated by ignition, whereas the diesel engine has the combustion form of self-ignites throughout the combustion space.

The combustion speed with respect to the engine load is a function of the cylinder internal temperature of the engine, the cylinder internal pressure, and A/F. Although it may be sequentially calculated by the CPU, it is preferable to speed up the subsequent arithmetic processing by storing the data group in the ROM under each condition. Also, if there is an EGR that recirculates the exhaust gas, the EGR rate is also a function of the combustion speed. It is preferable to add and store the EGR rate.

Figure 6:
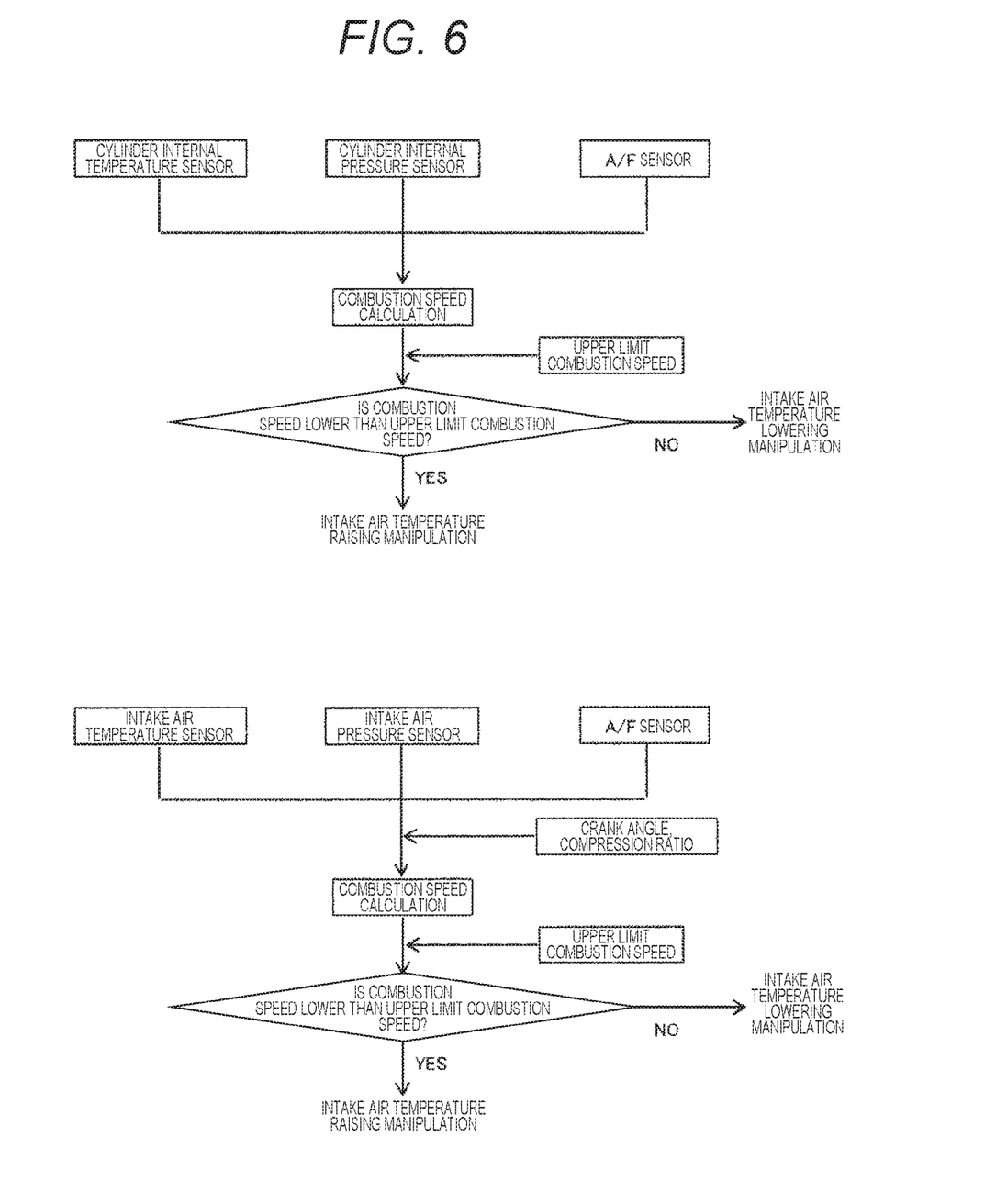
FIG. 6 is a diagram illustrating a method for determining a combustion speed in the first embodiment.

FIG. 6 illustrates a method for determining the combustion speed of the present invention. An upper stage is calculated by using the measured values of each sensor of the cylinder internal temperature, the cylinder internal pressure, and A/F. In the case of a gasoline engine, by using the upper limit value of the combustion speed indicated by the solid line in FIG. 5, the calculated combustion speed is compared with the upper limit value, and if the combustion speed is equal to or higher than the upper limit value, the manipulation of lowering the intake air temperature is performed, and if the combustion speed is equal to or lower than the upper limit value, the manipulation of raising the intake air temperature is performed.

In the diesel engine, the lower limit combustion speed is obtained. By using the lower limit value of the combustion speed indicated by the broken line of FIG. 5, the calculated combustion speed is compared with the lower limit value. If the combustion speed is equal to or higher than the lower limit value, there is no problem, and if the combustion speed is equal to or lower than the lower limit value, the manipulation for raising the intake air temperature is performed.

A lower stage is a method for performing calculation using the measured values of each sensor of the intake air temperature, the intake air pressure, and A/F. The temperature and pressure inside the engine cylinder are calculated, using the crank angle and the compression ratio from the measured values of the intake air temperature and the intake air pressure.

By comparing the above combustion speed with the required combustion speed, it becomes possible to determine whether to increase or decrease the amount of heating of intake air heating. Next, the manipulation condition is determined. In FIG. 1, the opening degrees of the flow rate control valves 31 and 33 are determined.

Figure 7:
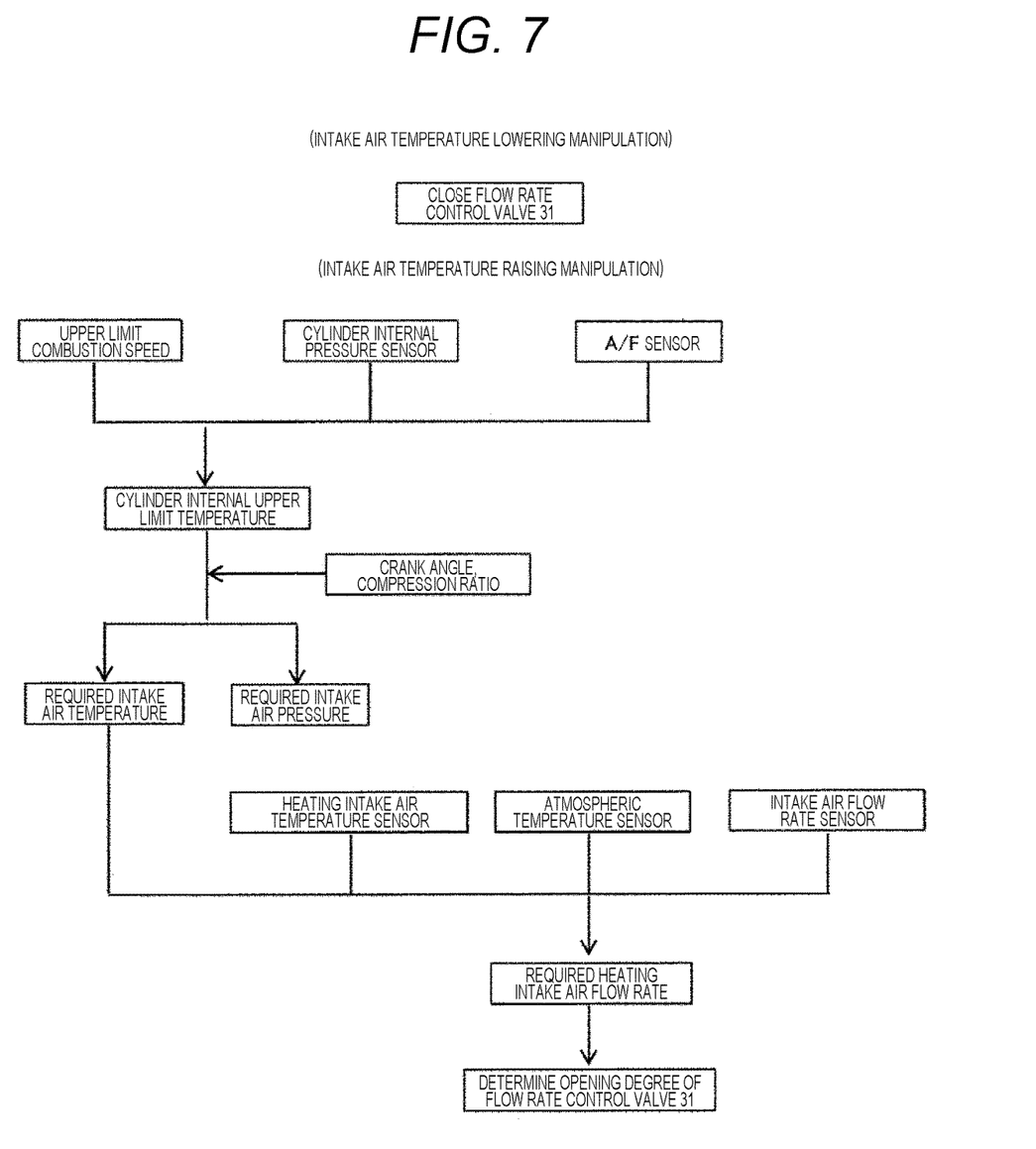
FIG. 7 is a diagram illustrating a method for determining the intake air heating manipulation in the first embodiment.

FIG. 7 illustrates a method for determining the intake air heating manipulation of the present invention. A gasoline engine is targeted. Since the intake air temperature lowering manipulation needs to immediately avoid knocking, it is a manipulation for closing the flow rate control valve 31 of the heating intake air.

In the intake air temperature raising manipulation, the reverse manipulation of the lower stage of FIG. 6 is performed. That is, the engine cylinder internal temperature upper limit value is calculated from the upper limit combustion speed, the measured value of the cylinder internal pressure sensor, and the measured value of the A/F sensor, and the required intake air temperature is calculated from the crank angle and the compression ratio. The intake air flow rate is fixed with respect to the engine load, and at the same time as the required intake air temperature is calculated, the intake air pressure is also calculated. The intake air temperature and the intake air pressure here are intake air manifold state values.

The amount of heat for heating the intake air at the ambient temperature to the required intake air temperature in the intake air manifold is obtained by the heat balance calculation. Further, the required heating intake air flow rate is calculated from the required intake air temperature, the measured value of the heating intake air temperature sensor, the measured value of the atmospheric temperature sensor, and the measured value of the intake air flow rate sensor. The intake air flow rate sensor here is a measured value of a sensor which measures the total intake air flow rate provided on the upstream side from the throttle. By determining the required heating intake air flow rate, the opening degree of the flow rate control valve 31 is determined.

The opening degree of the flow rate control valve 33 which adjusts the exhaust gas flow rate for heating the intake air is reflected in the measured value of the heating intake air temperature sensor. Here, in a case where the intake air manifold is made of a resin material, it is necessary to provide an upper limit temperature at which the intake air temperature is set to be equal to or lower than the heat resistance temperature. As illustrated in FIG. 1, a temperature sensor 41 is provided in the intake air manifold to monitor the temperature. When the temperature exceeds the heat resistance temperature, there is a need for a manipulation for temporarily closing the flow rate control valve 31 of the heating intake air to stop the intake air heating. In addition, if the required intake air temperature is equal to or higher than the upper limit temperature, there is a need for a manipulation for setting the required intake air temperature to the upper limit temperature.

The intake air temperature lowering manipulation in the diesel engine is a case where the intake air manifold is made of a resin material and is only a case where the intake air temperature becomes equal to or higher than its heat resistant temperature, and there is a need for a manipulation for temporarily closing the flow rate control valve 31 of the heating intake air until the intake air temperature becomes equal to or lower than the heat resistant temperature.

On the other hand, there is a need for the intake air temperature raising manipulation. The upper limit combustion speed of FIG. 7 is the lower limit combustion speed, and the in-cylinder upper limit temperature is the in-cylinder lower limit temperature. Similarly, the required intake air temperature and the required intake air pressure are calculated. Here, the required heating intake air flow rate is obtained from the required intake air pressure, the measured value of the heating intake air temperature sensor, the measured value of the atmospheric temperature sensor, and the measured value of the intake air flow rate sensor, and the opening degree of the flow rate control valve 31 is determined.

Second Embodiment

Figure 8:
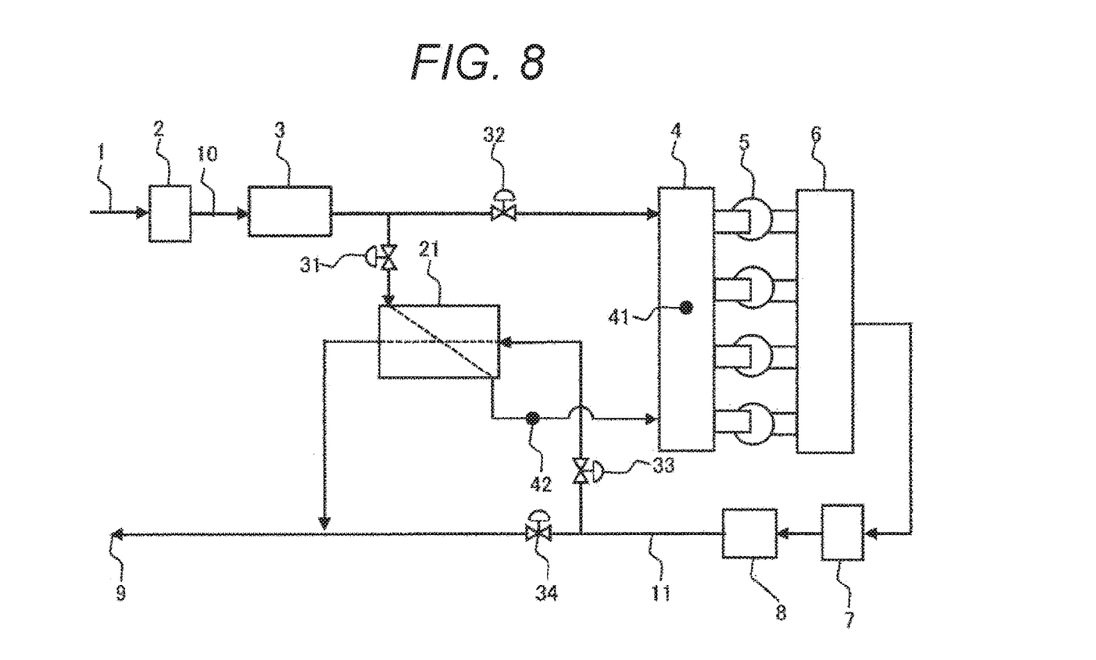
FIG. 8 is a configuration diagram of an engine system according to a second embodiment.

FIG. 8 illustrates an engine system according to the second embodiment. In the engine system according to the second embodiment, a flow rate control valve 32 is provided from the diverging point of the intake air pipe 10 to the intake air manifold 4, and a flow rate control valve 34 is provided on the downstream side of the diverging point of the exhaust air pipe 10.

By providing the flow rate control valve 32, the whole amount of intake air flow can be supplied to the heat exchanger 21, and by providing the flow rate control valve 34, the whole amount of exhaust gas can be supplied to the heat exchanger 21. As a result, it is possible to improve the heat transfer rate from the exhaust gas to the intake air.

Figure 9:
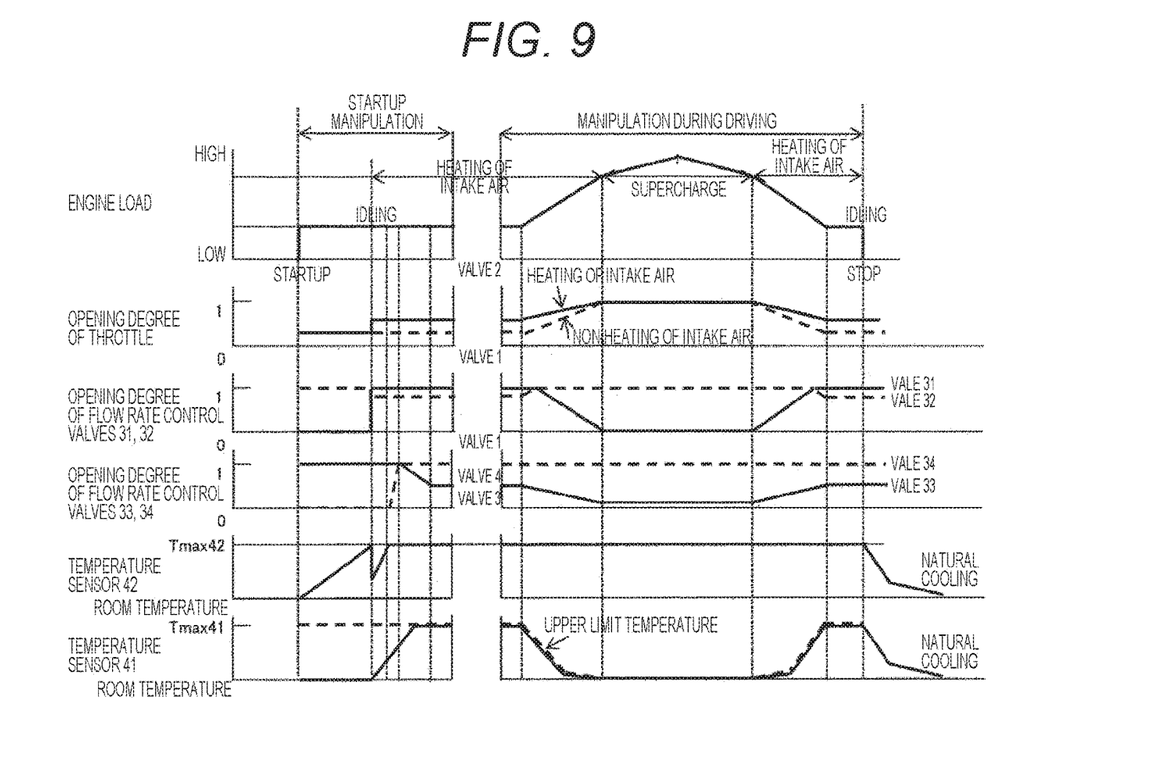
FIG. 9 is a diagram illustrating the behavior of the manipulation condition from an engine startup manipulation to a driving manipulation in the second embodiment.

FIG. 9 illustrates the behavior of the manipulation conditions from the engine startup manipulation to the driving manipulation in the second embodiment. The example illustrated in FIG. 9 is directed to a gasoline engine and is a behavior, in order from the top, of an engine load, an opening degree of throttle, opening degrees of two flow rate control valves provided on the intake gas side, opening degrees of two flow rate control valves provided on the exhaust gas side, the temperature of the temperature sensor provided at the intake outlet of the heat exchanger, and the temperature of the temperature sensor provided in the intake air manifold.

The engine startup time will be described. First, the engine is almost at the lowest load in the idling state, and the opening degree of throttle is small. The temperature of the heat exchanger 21 is low, and the engine is not in a state in which the intake air can be heated. Therefore, intake air is not supplied to the heat exchanger 21, and the high-temperature exhaust gas is ventilated as much as possible to heat the heat exchanger 21. Therefore, the opening degree of the flow rate control valve 31 of the intake air supplied to the heat exchanger 21 is set to 0, the opening degree of the flow rate control valve 32 of the intake air which is not heated is set to 1, that is, fully opened, and the whole intake air flow rate is supplied to the engine. On the other hand, since the exhaust gas immediately reaches a high temperature by the combustion in the engine, the opening degree of the flow rate control valve 33 of the exhaust gas supplied to the heat exchanger 21 is set to 1, the opening degree of the flow rate control valve 34 exhausted to the atmosphere is set to 0, and the whole amount of the exhaust gas is supplied to the heat exchanger 21.

The temperature of the temperature sensor 41 provided in the intake air manifold remains at the room temperature, the heat exchanger 21 gradually warms up, and the temperature of the temperature sensor 42 provided at the intake outlet of the heat exchanger 21 sharply rises to reach the temperature of Tmax 42. Tmax 42 is an upper limit temperature of the temperature sensor 42, and is a temperature that is controlled to a constant temperature in the subsequent engine operations.

The intake air heating is started when the temperature sensor 42 reaches Tmax 42. The opening degree of the flow rate control valve 31 of the intake air supplied to the heat exchanger 21 is set to 1, that is, fully opened, and the flow rate control valve 32 of intake air which is not heated is lowered to a predetermined opening degree at the time of idling. At this time, the opening degrees of the two flow rate control valves 31 and 32 are determined by the method described in the second and third embodiments.

The relation between the two flow rate control valves is based on the states of the opening degree 1 of the flow rate control valve 31 and the opening degree 1 of the flow rate control valve 32. When the intake air flow rate to be heated is increased, the opening degree 1 of the flow rate control valve 31 is maintained, and the relation moves in a direction of decreasing the opening degree of the flow rate control valve 32. When decreasing the intake air flow rate to be heated, the state of the opening degree 1 of the flow rate control valve 32 is maintained, and the relation moves in a direction of decreasing the opening degree of the flow rate control valve 31. Therefore, only one opening degree combination is determined for the intake air flow rate to be heated. This relation also applies to the flow rate control valve 33 of the exhaust gas supplied to the heat exchanger 21 and the flow rate control valve 34 exhausted to the atmosphere. On the basis of the states of the opening degree 1 of the flow rate control valve 33 and the opening degree 1 of the flow rate control valve 34, when the amount of heat of intake air heating is increased, the opening degree 1 of the flow rate control valve 33 is maintained, and the relation moves in a direction of decreasing the opening degree of the flow rate control valve 34. When the amount of heat of intake air heating is decreased, the state of the opening degree 1 of the flow rate control valve 34 is maintained, and the relation moves in a direction of decreasing the opening degree of the flow rate control valve 33.

By supplying the intake air to the heat exchanger 21, the temperature of the temperature sensor 42 temporarily drops. However, by controlling the opening degrees of the flow rate control valve 33 of the exhaust gas supplied to the heat exchanger 21 and the flow rate control valve 34 exhausted to the atmosphere, using the temperature of the temperature sensor 42 as an index, the control of maintaining the opening degree 1 of the flow rate control valve 33 and the opening degree 0 of the flow rate control valve 33 is continued, the temperature of the temperature sensor 42 gradually rises, and the temperature is restored to the temperature of Tmax 42.

In order to maintain the temperature of the temperature sensor 42 provided at the intake outlet of the heat exchanger 21, the opening degree of the flow rate control valve 34 rises up to 1, and thereafter, the temperature changes in the direction of decreasing the opening degree of the flow rate control valve 33.

The temperature of the temperature sensor 41 provided in the intake air manifold gradually rises from the start of intake air heating and reaches the upper limit temperature Tmax 41 at the time of idling. At this time, the engine load, the opening degree of the slot, each opening degree of the flow rate control valves 31 and 32 of intake air, each opening degree of the flow rate control valves 33 and 34 of exhaust air, and the intake air temperature of the temperature sensor 41 of the intake air manifold are in a steady state at the time of idling. The dotted line is the intake air temperature calculated from the combustion speed, and it is possible to perform a control approaching the temperature in the steady state at the time of idling.

The driving manipulation will be explained. The driver manipulates the accelerator and gradually increases the engine load. The opening degree of throttle gradually increases. The dotted line represents the time when the intake air is heated, and the broken line represents the time when the intake air is not heated. Since the opening degree of throttle can be increased by the intake air heating, resistance at the throttle valve can be reduced, and a pumping loss can be reduced. A difference between the solid line and the broken line is an effect of reducing the pumping loss. As the engine load decreases, the effect of reducing the pumping loss increases, and as the engine load increases, the effect of reducing the pumping loss decreases.

As illustrated in FIG. 5, as the engine load increases, the combustion speed increases. Therefore, the temperature of the temperature sensor 41 provided in the intake air manifold decreases. The amount of heat of intake air heating may decrease accordingly. First, the opening degree of the flow rate control valve 32 of the intake air which is not heated approaches 1, and thereafter, the opening degree of the flow rate control valve 31 of the intake air supplied to the heat exchanger 21 decreases. When the opening degree of throttle reaches 1, the opening degree of the flow rate control valve 31 becomes zero.

The heat transfer amount may be small by the heat exchanger 21, and the opening degree of the flow rate control valve 33 of the exhaust gas supplied to the heat exchanger 21 decreases. The opening degree of the flow rate control valve 34 exhausted to the atmosphere is maintained at 1.

When the engine load further increases, the compression turbo is driven while keeping the opening degree of throttle at 1, and the engine load falls in the supercharging range. Since the opening degrees of the flow rate control valve 33 and the flow rate control valve 34 are controlled so that the temperature of the temperature sensor 42 provided at the intake outlet of the heat exchanger 21 is kept at a constant temperature, the opening degree of the flow rate control valve 33 does not become 0 in this range. That is, heat is supplied from the exhaust gas to prevent temperature drop caused by the heat radiation of the heat exchanger 21. The control is a preparatory manipulation for restarting the intake air heating, and it is possible to heat the intake air at a high speed.

The engine load is lowered, the state transits from the supercharging range to the range of intake air heating, and until reaching the idling state, the behavior reverse to that of when the engine load is increased occurs. Thus, the description will not be provided.

When the engine is stopped in the idling state, the opening degrees of the flow rate control valves 31 to 34 are the opening degrees of the idling state. The opening degrees are different from the opening degrees when the engine is started. Therefore, there is a need for an automatic manipulation in which the opening degree of the flow rate control valve 31 of the intake air supplied to the heat exchanger 21 at the time of startup of the engine is set to 0, the opening degree of the flow rate control valve 32 of intake air which is not heated is set to 1, the opening degree of the flow rate control valve 33 of the exhaust gas supplied to the heat exchanger 21 is set to 1, and the opening degree of the flow rate control valve 34 exhausted to the atmosphere is set to 0.

Figure 10:
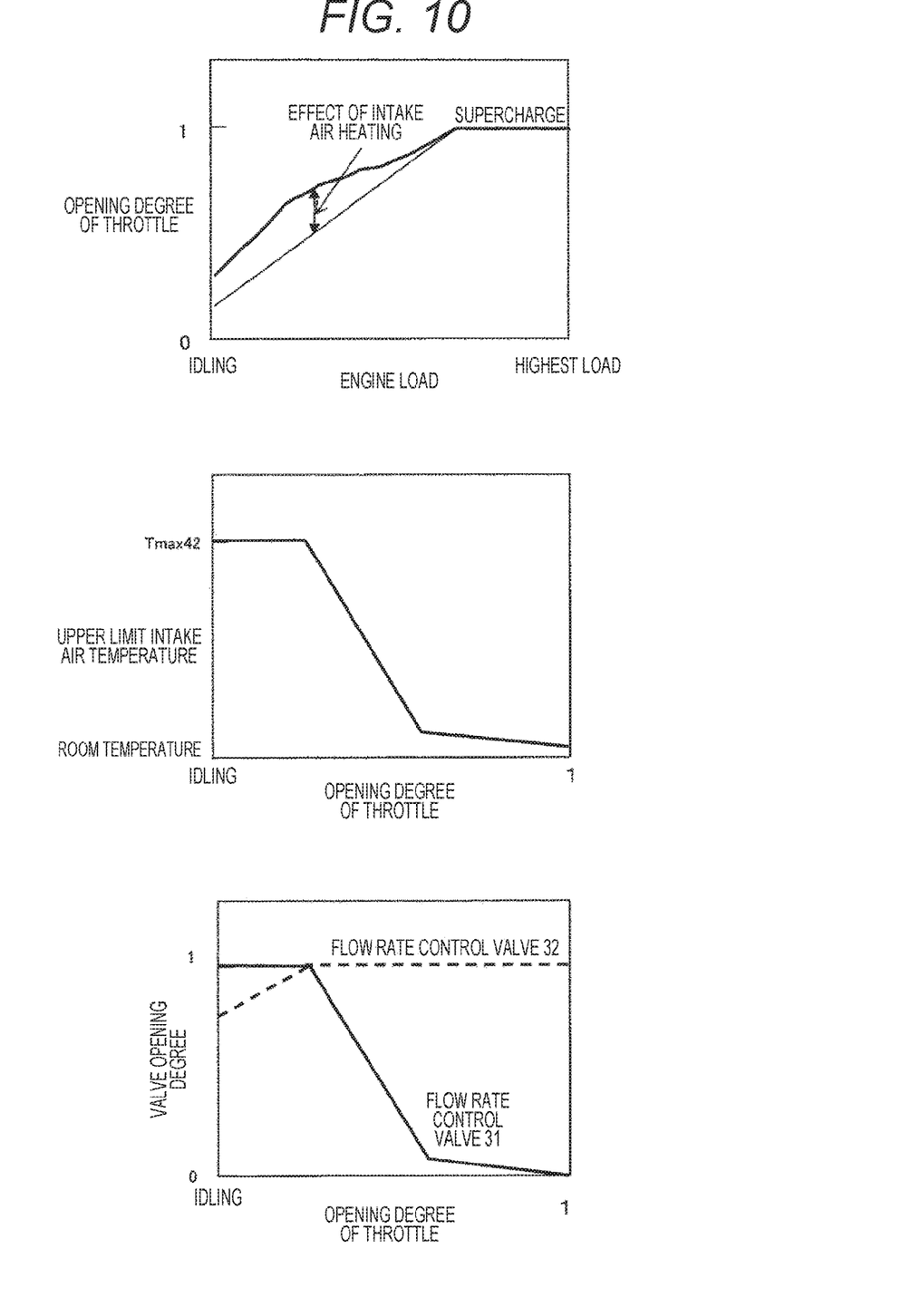
FIG. 10 is a diagram illustrating data groups that are preferably stored on the ROM in the second embodiment.

FIG. 10 illustrates a data group which is preferably stored in the ROM of the present invention. The first is a relation between the engine load and the opening degree of throttle. Since the relation when intake air is not heated cannot be used, it is updated for intake air heating. The second is a relation between the engine load and the upper limit intake air heating temperature. Since the intake air heating range of the gasoline engine is the condition of the opening degree of throttle of 1 or less, the engine load can also be represented by the opening degree of throttle. Third is a relation between the opening degree of throttle and the opening degree of each of the flow rate control valve 31 on heating the intake air and the flow rate control valve 32 on not-heating the intake air. By using these three relations, the control of the intake air heating speeds up.

Third Embodiment

Figure 11:
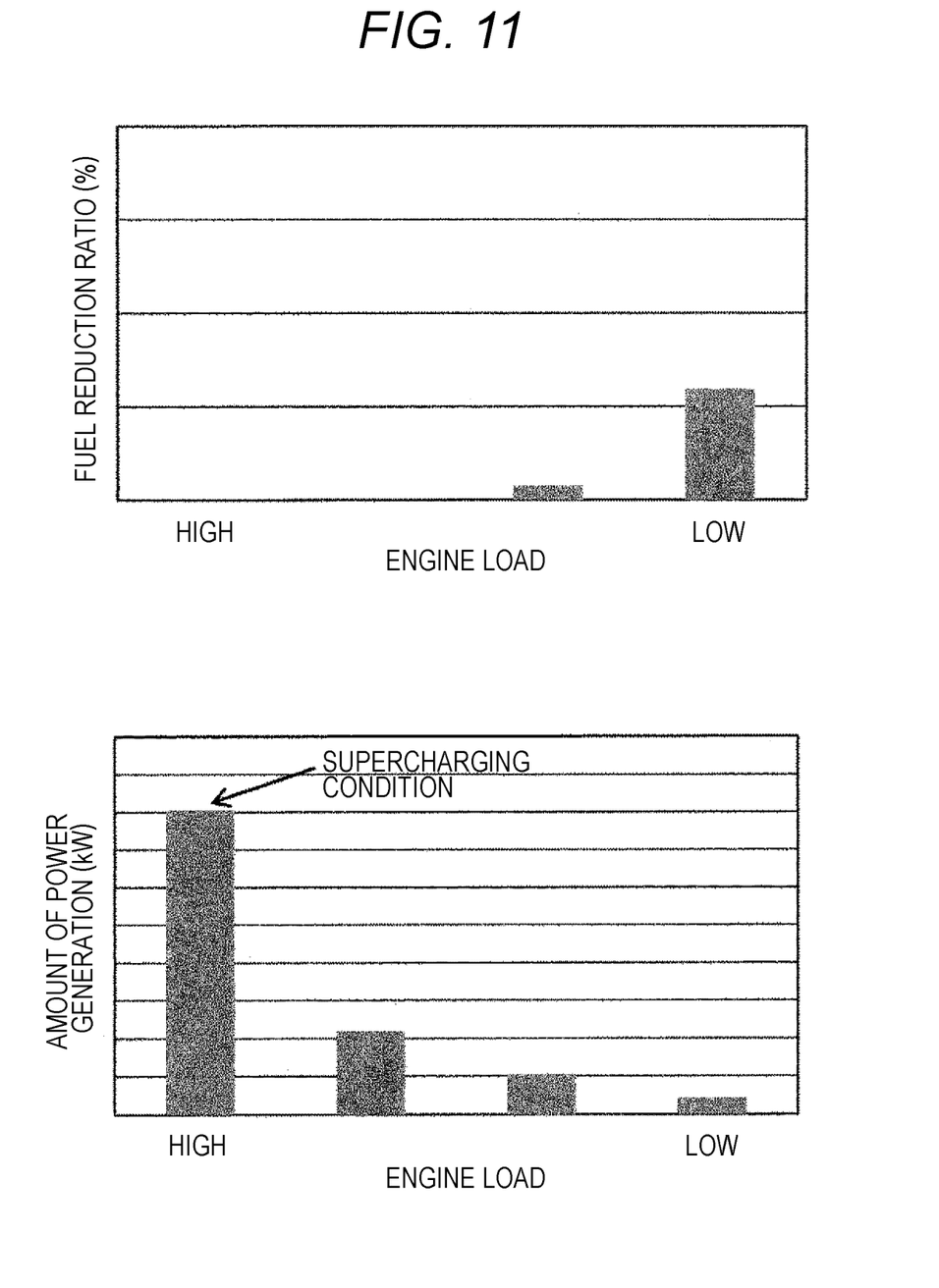
FIG. 11 is a diagram illustrating the effect of exhaust gas heat recovery.

FIG. 11 illustrates an effect of heat recovery and effective utilization of the exhaust gas of the present invention. An upper stage illustrates an effect of reducing fuel by heating the intake air with exhaust gas. A vertical axis is a fuel reduction rate and is defined by the following formula at the same engine load.

Fuel reduction rate (%)={(fuel flow rate when intake air is not heated)−(fuel flow rate when intake air is heated)}/(fuel flow rate when intake air is not heated)×100

The fuel reduction effect is large under the condition of low engine load, which has a large pumping loss reduction effect, and the effect cannot be expected under condition of high engine load that supercharges with the opening degree of throttle of 1.

A lower stage illustrates an amount of power generation when generating power with exhaust gas pressure or heat. The amount of power generation is large under the condition of high engine load that supercharges with the opening degree of throttle of 1 and the amount of power generation is small under the condition of low engine load.

Therefore, in order to recover the heat gas heat and make effective use, it is also effective to change the effective usage method depending on the engine load.

Figure 12:
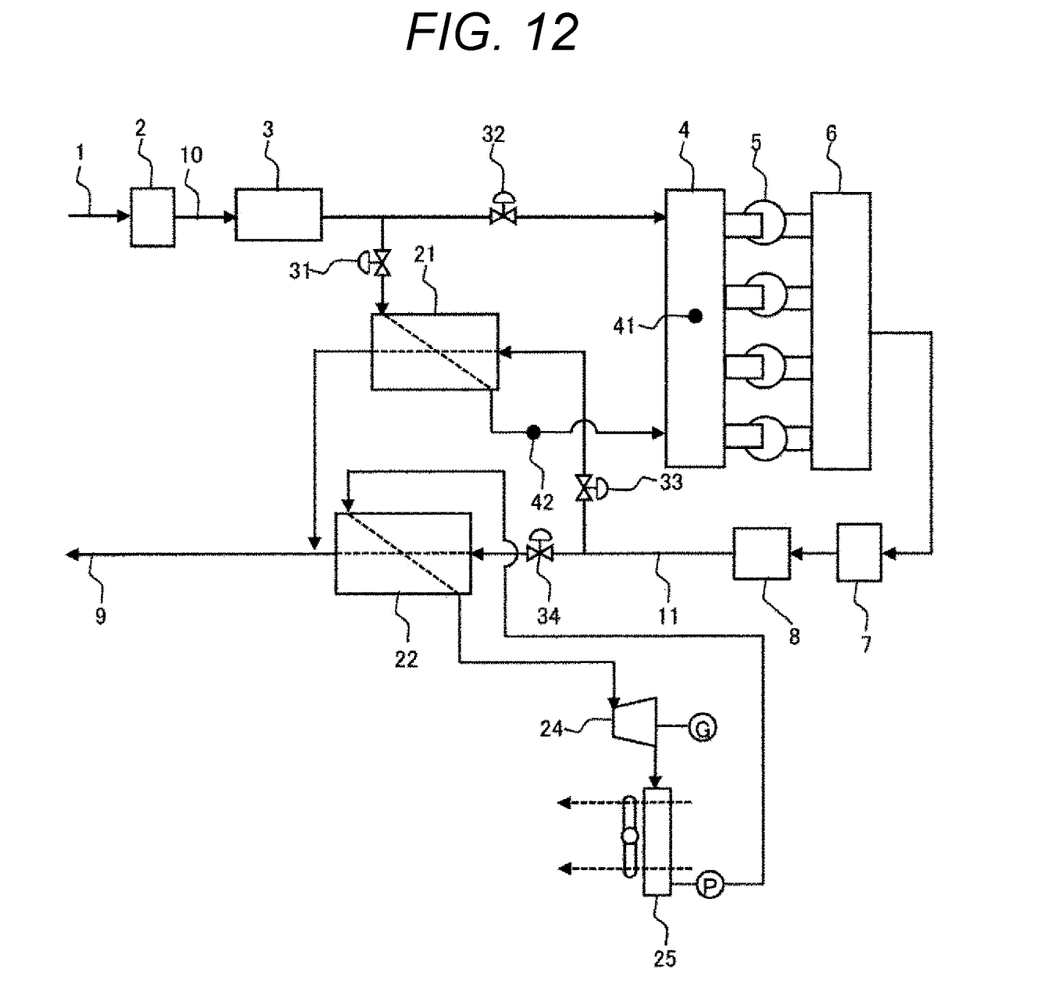
FIG. 12 is a configuration diagram of an engine system according to a third embodiment.

FIG. 12 illustrates an engine exhaust gas heat recovery and effective utilization system of the present invention. In the intake air heating method using the engine exhaust gas in FIG. 8, a Rankine cycle is provided in which a liquid-gas heat exchanger 22 is provided downstream of the flow rate control valve 34, the liquid working medium is heated by the exhaust gas heat, the expander 24 is driven by vapor of the working medium to generate electricity, the working medium vapor leaving the expander is condensed with a condenser 25 and is converted into liquid, and the liquid is supplied to the liquid-gas heat exchanger 22 again.

Under the condition of the high engine load in which the intake air is not heated, electricity is generated with the Rankine cycle. Further, even under the condition of low engine load in which the intake air is heated, since an overall amount of the exhaust gas is not supplied only to the heat exchanger 21, but also to the liquid-gas heat exchanger 22, electricity is always generated with the Rankine cycle.

There is a thermoelectric conversion element that generates electricity by a temperature difference. A thermoelectric conversion module incorporating the thermoelectric conversion element can be incorporated in the liquid-gas heat exchanger 22 to generate electricity. Further, it is also possible to generate electricity, by incorporating a heat exchanger in which thermoelectric conversion modules are incorporated before and after the liquid-gas heat exchanger 22.

Furthermore, by motorizing the compression turbo, it is possible to generate electricity with the expansion turbo.

REFERENCE SIGNS LIST

1 . . . air, 2 . . . compression turbo, 3 . . . throttle valve, 4 . . . intake air manifold, 5 . . . engine, 6 . . . exhaust air manifold, 7 . . . expansion turbo, 8 . . . exhaust gas purifying catalyst, 9 . . . exhaust gas, 10 . . . intake gas pipe, 11 . . . exhaust gas pipe, 12 . . . intercooler, 21 . . . heat exchanger, 22 . . . liquid-gas heat exchanger, 24 . . . expansion machine, 25 . . . condenser, 31 to 34 . . . flow rate control valve, 41, 42 . . . temperature sensor, 51 . . . heater

The invention claimed is:
1. An apparatus comprising:
an engine system control device which controls an engine system including an engine configured to combust air-fuel mixture, an intake air path configured to take air to the engine, and an intake air heating mechanism configured to heat the intake air, wherein
a heating amount of the intake air is controlled depending on a combustion speed of the air-fuel mixture,
the combustion speed is a function of: i) temperature in a cylinder of the engine for burning the fuel, ii) a pressure in the cylinder, iii) an A/F which is the ratio of the air flow rate A and fuel flow rate F, and iv) an EGR rate,
the intake air heating mechanism heats the intake air by exhaust heat generated by combustion,
the intake air heating mechanism has a heat exchanger configured to exchange heat between the intake air and the exhaust air,
the heat exchanger is configured to exchange heat between intake air flowing through an intake air diverging path diverged from the intake air path and exhaust air flowing through an exhaust air diverging path diverged from an exhaust air path exhausted from the engine,
an intake air diverging path side flow rate control valve is provided in the intake air diverging path,
an exhaust air diverging path side flow rate control valve is provided in the exhaust air diverging path,
opening degrees of the intake air diverging path side flow rate control valve and the exhaust air diverging path side flow rate control valve are controlled depending on the combustion speed,
the intake air after the heat exchange is returned to an intake air manifold provided upstream of the engine,
an intake air manifold temperature sensor configured to measure an intake air temperature in the intake air manifold is provided to control the opening degree of the flow rate control valve on the basis of the intake air temperature, and
at the time of startup of the engine, a control is performed in which the opening degree of the intake air diverging path side flow rate control valve is fully closed, and the opening degree of the exhaust air diverging path side flow rate control valve is fully opened.

2. The apparatus according to claim 1, wherein a post-heat exchange intake air temperature sensor configured to measure the intake air temperature after the heat exchange is provided, and the exhaust air diverging path side flow rate control valve is controlled on the basis of the intake air temperature after the heat exchange.

3. The apparatus according to claim 2, wherein an intake air main path side flow rate control valve is provided in a main path between a diverging point of the intake air pipe and the engine, and the heating amount of the intake air is controlled, using the intake air main path side flow rate control valve and the intake air diverging path side flow rate control valve.

4. The apparatus according to claim 2, wherein an exhaust air main path side flow rate control valve is provided in a main path downstream from the diverging point of the exhaust air path, and a control is performed so that the intake air temperature after the heat exchange becomes a target temperature, using the exhaust air main path side flow rate control valve and the exhaust air diverging path side flow rate control valve.

5. The apparatus according to claim 4, wherein, at the time of start-up of the engine, the opening degree of the intake air main path side flow rate control valve is fully opened, the opening degree of the intake air diverging path side flow rate control valve is fully closed, the opening degree of the exhaust air main flow path side flow rate control valve is fully closed, and the opening degree of the exhaust air diverging path side flow rate control valve is fully opened.

6. The apparatus according to claim 1, wherein the heating amount of the intake air is controlled depending on an opening degree of a throttle provided in the intake air path.

7. An apparatus comprising:

an engine system control device which controls an engine system including an engine configured to combust air-fuel mixture, an intake air path configured to take air to the engine, and an intake air heating mechanism configured to heat the intake air, wherein a heating amount of the intake air is controlled depending on a combustion speed of the air-fuel mixture, the intake air heating mechanism heats the intake air by exhaust heat generated by combustion, the intake air heating mechanism has a heat exchanger configured to exchange heat between the intake air and the exhaust air, the heat exchanger is configured to exchange heat between intake air flowing through an intake air diverging path diverged from the intake air path and exhaust air flowing through an exhaust air diverging path diverged from an exhaust air path exhausted from the engine, an intake air diverging path side flow rate control valve is provided in the intake air diverging path, an exhaust air diverging path side flow rate control valve is provided in the exhaust air diverging path, opening degrees of the intake air diverging path side flow rate control valve and the exhaust air diverging path side flow rate control valve are controlled depending on the combustion speed, the intake air after the heat exchange is returned to an intake air manifold provided upstream of the engine, a post-heat exchange intake air temperature sensor configured to measure the intake air temperature after the heat exchange is provided, the exhaust air diverging path side flow rate control valve is controlled on the basis of the intake air temperature after the heat exchange, an exhaust air main path side flow rate control valve is provided in a main path downstream from the diverging point of the exhaust air path, a control is performed so that the intake air temperature after the heat exchange becomes a target temperature, using the exhaust air main path side flow rate control valve and the exhaust air diverging path side flow rate control valve, and at the time of start-up of the engine, the opening degree of the intake air main path side flow rate control valve is fully opened, the opening degree of the intake air diverging path side flow rate control valve is fully closed, the opening degree of the exhaust air main flow path side flow rate control valve is fully closed, and the opening degree of the exhaust air diverging path side flow rate control valve is fully opened.

* * * * *